No. 864,431. PATENTED AUG. 27, 1907.
A. W. ROM.
MOLDING MACHINE.
APPLICATION FILED MAY 8, 1905.
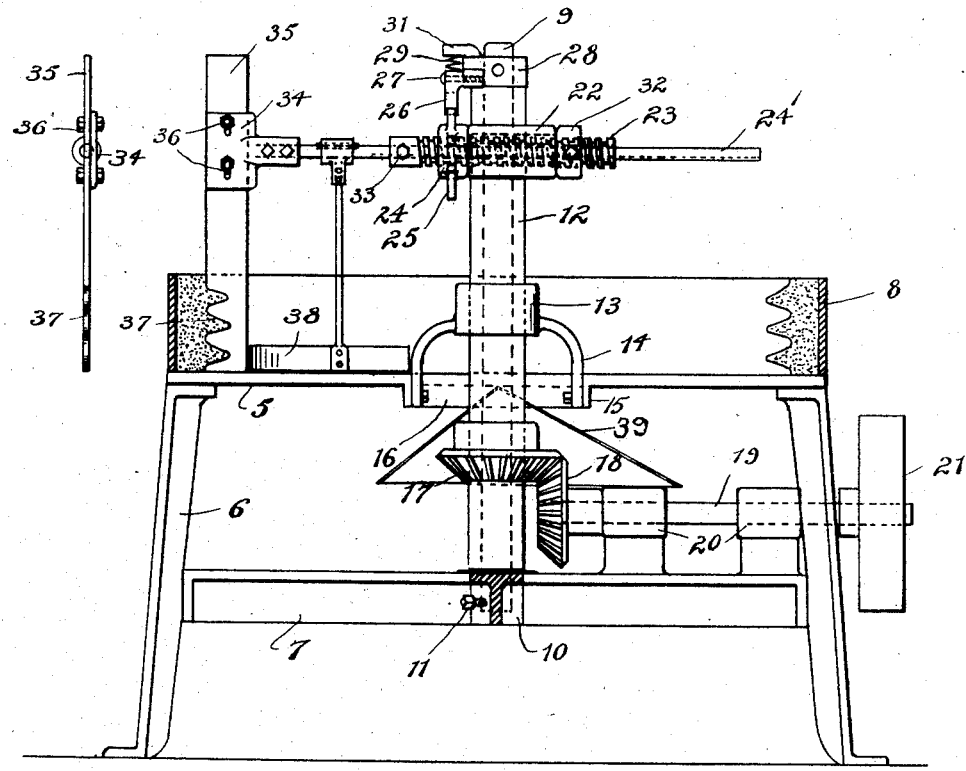
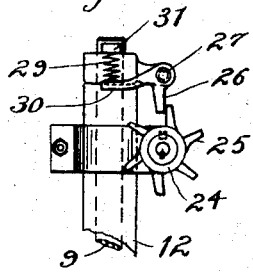
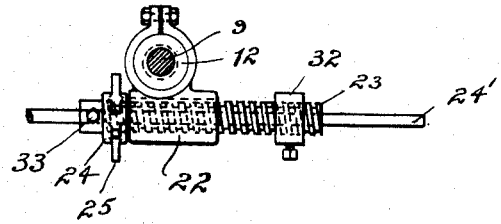
Witnesses:
B. C. Bean
M. C. Sikberg
Inventor,
August W. Rom,
By Glenn S. Noble
Att'y.

UNITED STATES PATENT OFFICE.

AUGUST W. ROM, OF CHICAGO, ILLINOIS.

MOLDING-MACHINE.

No. 864,431.     Specification of Letters Patent.     Patented Aug. 27, 1907.

Application filed May 8, 1905. Serial No. 259,267.

*To all whom it may concern:*

Be it known that I, AUGUST W. ROM, a citizen of the United States, residing at Chicago, in the county of Cook and State of Illinois, have invented certain new and useful Improvements in Molding-Machines, of which the following is a specification.

This invention relates more particularly to machines for making molds for circular castings such as pulleys, wheels or the like and is particularly adapted for making molds for casting grooved sheaves. Its objects are to provide a machine of this character which will accurately and rapidly form the grooved portion of the mold, so that much less labor will be required than in known methods of making such molds.

Other objects and general and specific novel features will be pointed out in the following description, in which reference is made to the accompanying drawings.

Figure 1 represents a sectional elevation of a machine embodying this invention. Fig. 2 is a detail showing an edge view of the forming tool. Fig. 3 is a detail showing the tool feeding device, and, Fig. 4 is a top plan view of a portion of the feed mechanism.

As shown in Fig. 1, a suitable frame is provided, which consists of a top plate 5, legs 6 and spider brace 7. A flask 8, in which the mold is to be formed, is supported on the top plate or table 5. A central vertical shaft 9 is supported in a socket 10 in the spider 7 and is prevented from turning by a set screw, or the like, 11. A sleeve or quill 12 fits closely over the shaft 9 and rests on the upper part of the socket 10. This sleeve is adapted to turn freely on the shaft 9, and is further supported by means of a bearing on arms 14 secured to a depending flange 15, around an opening 16 in the center of the table 5. The sleeve 12 is driven in any convenient manner, as by gear 17 which meshes with a gear 18 on a counter-shaft 19 secured in suitable bearings 20 on the frame. This shaft is preferably driven by means of a pulley or the like, 21.

Near the top of the sleeve 12 is clamped or fastened a horizontal bearing 22 which carries a tubular feed screw 23, which is feathered to slide freely therein without turning. This screw is fed forward by means of a nut 24 having projecting fingers or lugs 25, which are adapted to engage with a spring pressed pawl 26, pivoted at 27, to a collar 28 rigidly fastened to the shaft 9. This pawl is held in normal position by means of the spring 29 which extends between an arm 30 connected with said pawl and a lug 31 extending out from the collar 28. The screw is provided with a stop collar 32 which may be adjusted to any desired position. The tubular feed screw 23 carries a shaft 24' which is adjustably secured therein by means of a set screw 33 and which is also feathered to prevent its rotating in said feed screw. This shaft carries at its outer end, a bracket or support 34 to which is adjustably secured the forming tool 35, by means of bolts 36 which enter into slotted holes in said support.

The forming tool may be made in any desired manner and the forming part shaped to correspond with the desired mold to be made. In this instance, I have shown the forming tool as a plate, preferably of steel, having its lower outer edge provided with serrations 37 corresponding to the grooves to be formed in the mold, for the grooved periphery of a sheave.

Adjacent to the forming tool is a scraper 38 which is adapted to gather the loosened material and carry it to the opening 16 in the center of the table 5 where it is discharged down onto the floor, the gears being protected by means of a hood 39.

The operation of this machine is as follows. The material for the mold, preferably green sand, is rammed in the ordinary manner around on the inner side of the flask 8 until a suitable thickness is provided in which the grooves are to be formed. The forming tool is then set with its outer edge close to the inner wall of the sand and the stop collar 32 set for the proper diameter of the sheave to be formed. The machine is then started with the forming tool rotating in the direction of the hands of the clock, and at each revolution the nut 24 is turned one tooth or space as the projecting fingers 25 come in contact with the pawl 26. In the meantime, the scraper 38 carries away the dislodged sand or material as the forming tool gradually works the grooves into the face of the mold. When the stop 32 comes into contact with the bearing 22, the nut can turn no farther and the fingers 25 striking against the pawl 26, simply raise the latter against the tension of the spring 29. The outer portion of the mold being formed in this manner, the inner portion may be made in any well known manner and the two set together to form a complete mold for the sheave.

It will be noted that other material, such as loam may also be used for forming the molds, and various changes in the details of construction and manner of driving this machine will readily suggest themselves as coming within the scope of my invention, and I do not wish to limit myself to the exact construction herein set forth, but

What I claim and desire to secure by Letters Patent is:

1. In a molding machine, the combination of a frame, a table on said frame, a vertical shaft mounted in said frame, a sleeve mounted on said shaft, means for driving said sleeve, a bearing on said sleeve, a horizontal shaft carried in said bearing, a forming tool carried by said horizontal shaft, and means for feeding said shaft forward to present the tool to the face of the mold to be formed.

2. In a molding machine, the combination of a table, a shaft mounted vertically of said table, a sleeve rotatably secured on said shaft, means for rotating said sleeve, a bearing carried by said sleeve, a feed screw carried in said bearing, a shaft adjustably secured in said feed screw, a forming tool carried by said last mentioned shaft, a stop on said feed screw, a feed nut on said screw, and means for turning said nut.

3. The combination of a frame, a table mounted on said frame, a shaft securely fixed centrally of said frame, a sleeve rotatably mounted on said shaft, a gear on said sleeve, a counter-shaft, a gear on said counter-shaft meshing with said first-named gear, means for driving said counter-shaft, a bearing secured to said sleeve, a cylindrical feed screw slidably mounted in said bearing, a shaft adjustably secured in said feed screw, a nut on said feed screw, provided with projecting fingers, a collar secured to said vertical shaft, a yielding pawl pivoted on said collar and adapted to engage with the fingers of said feed screw, and a forming tool secured to the shaft in said feed screw.

AUGUST W. ROM.

Witnesses:
B. C. BEAN,
RALPH E. NOBLE.